(12) United States Patent
Kumar B. S. et al.

(10) Patent No.: US 9,674,327 B2
(45) Date of Patent: Jun. 6, 2017

(54) CONTROLLING DISPLAY DEVICES TO INTERFERE WITH IMAGING BY MOBILE TERMINALS

(71) Applicant: CA, INC., New York, NY (US)

(72) Inventors: Kiran Kumar B. S., Thyagarajanagar (IN); Jameel Ahmed Kaladgi, Kavalbyrasandra (IN); Praveen Kumar Thakur, Seegehalli Village (IN)

(73) Assignee: CA, INC., Islandia, NY (US)

( * ) Notice: Subject to any disclaimer, the term of this patent is extended or adjusted under 35 U.S.C. 154(b) by 22 days.

(21) Appl. No.: 14/835,427

(22) Filed: Aug. 25, 2015

(65) Prior Publication Data

US 2017/0064059 A1    Mar. 2, 2017

(51) Int. Cl.
*H04M 1/22* (2006.01)
*G09G 5/10* (2006.01)

(52) U.S. Cl.
CPC ............ *H04M 1/22* (2013.01); *G09G 5/10* (2013.01); *G09G 2358/00* (2013.01)

(58) Field of Classification Search
CPC ........ H04M 1/22; G09G 5/10; G09G 2358/00
See application file for complete search history.

(56) References Cited

U.S. PATENT DOCUMENTS

| | | | |
|---|---|---|---|
| 2008/0259154 A1* | 10/2008 | Garrison | .................. H04N 7/14 348/14.01 |
| 2013/0254874 A1 | 9/2013 | Xu | |
| 2013/0320099 A1* | 12/2013 | Acton | .............. G06K 19/06056 235/494 |
| 2014/0201844 A1 | 7/2014 | Buck | |

\* cited by examiner

*Primary Examiner* — Mekonnen Dagnew
(74) *Attorney, Agent, or Firm* — Sage Patent Group

(57) ABSTRACT

A first mobile terminal processes video data from a camera of the first mobile terminal to identify occurrence of a second mobile terminal being aligned to electronically image a display device of the first mobile terminal. Responsive to identifying occurrence of the second mobile terminal being aligned to electronically image the display device, the first mobile terminal controls operation of the display device of the first mobile terminal to interfere with an ability of the second mobile terminal to be operated to electronically image the display device. Related mobile terminals and computer program products are disclosed.

15 Claims, 7 Drawing Sheets

CONTROLLING DISPLAY DEVICES TO INTERFERE WITH IMAGING BY MOBILE TERMINALS

BACKGROUND

The present disclosure relates to mobile terminals and, more particularly, to controlling display devices of mobile terminals.

Mobile terminals have become pervasive in society. Mobile terminals are carried by persons throughout their day and used continuously for both personal and business matters. The availability of high resolution cameras on mobile terminals everywhere that is accessible to persons raises security concerns for how to maintain security of confidential and personal information that is displayable on display devices that are accessible to such persons.

BRIEF SUMMARY

One embodiment of the present disclosure is directed to a method by a first mobile terminal. The method includes processing video data from a camera of the first mobile terminal to identify occurrence of a second mobile terminal being aligned to electronically image a display device of the first mobile terminal. Responsive to identifying occurrence of the second mobile terminal being aligned to electronically image the display device, the method controls operation of the display device of the first mobile terminal to interfere with an ability of the second mobile terminal to be operated to electronically image the display device.

Another embodiment of the present disclosure is directed to a first mobile terminal that includes a camera, a display device, a processor, and a memory coupled to the processor and comprising computer readable program code embodied in the memory. The computer readable program code when executed by the processor causes the processor to perform operations that include processing video data from the camera to identify occurrence of a second mobile terminal being aligned to electronically image the display device. Responsive to identifying occurrence of the second mobile terminal being aligned to electronically image the display device, the operations further include controlling operation of the display device to interfere with an ability of the second mobile terminal to be operated to electronically image the display device.

Various further embodiments are directed to operations and methods for identifying when the second mobile terminal is being aligned to electronically image the display device of the first mobile terminal, and are directed to operations and methods for controlling operation of the display device to interfere with an ability of the second mobile terminal to be operated to electronically image the display device.

It is noted that aspects described herein with respect to one embodiment may be incorporated in different embodiments although not specifically described relative thereto. That is, all embodiments and/or features of any embodiments can be combined in any way and/or combination. Moreover, other methods, mobile terminals, and computer program products according to embodiments will be or become apparent to one with skill in the art upon review of the following drawings and detailed description. It is intended that all such additional methods, mobile terminals, and computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

As explained above, the availability of high resolution cameras on mobile terminals everywhere accessible to a person raises security concerns for how to maintain security of confidential and personal information that is displayable on display devices accessible to the person. Various embodiments of the present disclosure are directed to interfering with the ability of a mobile terminal to be used to electronically image display device.

Figure 1:
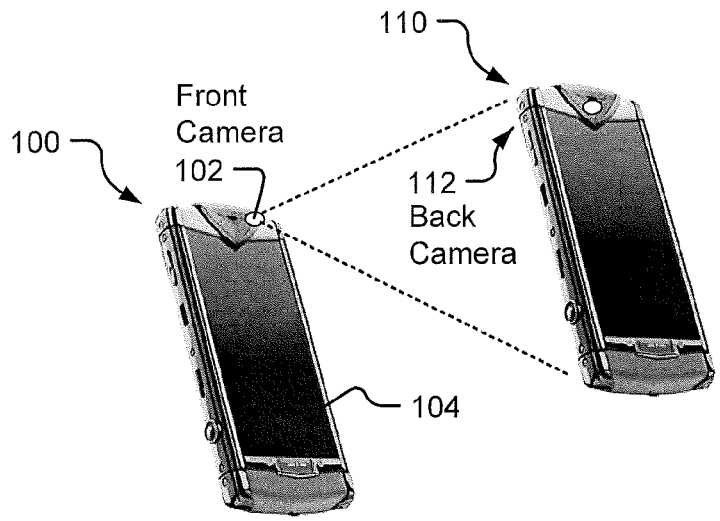
FIG. 1 illustrates a first mobile terminal that is configured to identify occurrence of a second mobile terminal being aligned to electronically image a display device of the first mobile terminal and to interfere with an ability of the second mobile terminal to be operated to electronically image the display device, in accordance with various embodiments of the present disclosure.

FIG. 1 illustrates a first mobile terminal 100 which may be displaying information on a display device 104 that is confidential, personal, or otherwise sensitive such that it should not be electronically imaged by another mobile terminal. In the illustrated scenario, the second mobile terminal 110 is aligned in close proximity to the first mobile terminal 100 so that a camera 112 of the second mobile terminal 110 (e.g., a back camera exposed through a back surface of the second mobile terminal 100) can be used to electronically image any information displayed on the display device 104. The electronic imaging attempted through the camera 112 can include, but is not limited to, taking a digital photograph, recording video, and/or other operations to obtain a digital representation of information displayed on the display device 104.

The first and second mobile terminals can be any type of mobile electronic device including, but not limited to, smart phones, palmtop computers, tablet computers, laptop computers, gaming devices, video playback devices, smart watches, smart appliances, etc.

In accordance with various embodiments of the present disclosure, the first mobile terminal 100 is configured to identify occurrence of the second mobile terminal 110 being aligned to electronically image the display device 104 of the first mobile terminal 100 and to interfere with an ability of the second mobile terminal 110 to be operated to electronically image the display device 104. As will be explained in further detail below, interfering with the ability of the second mobile terminal 110 to electronically image the display device 100 can include, but is not limited to: 1) turning off the display device; 2) reducing brightness of the display device to below a threshold level that interferes with imaging; 3) removing and/or obscuring information displayed on the display device; 4) repetitively inserting an interference image into a sequence of image data frames to be displayed to interfere with imaging; 5) dithering locations of letters to interfere with imaging; and/or 6) modifying a refresh rate of image data frames displayed on the display device to interfere with imaging.

Figure 2:
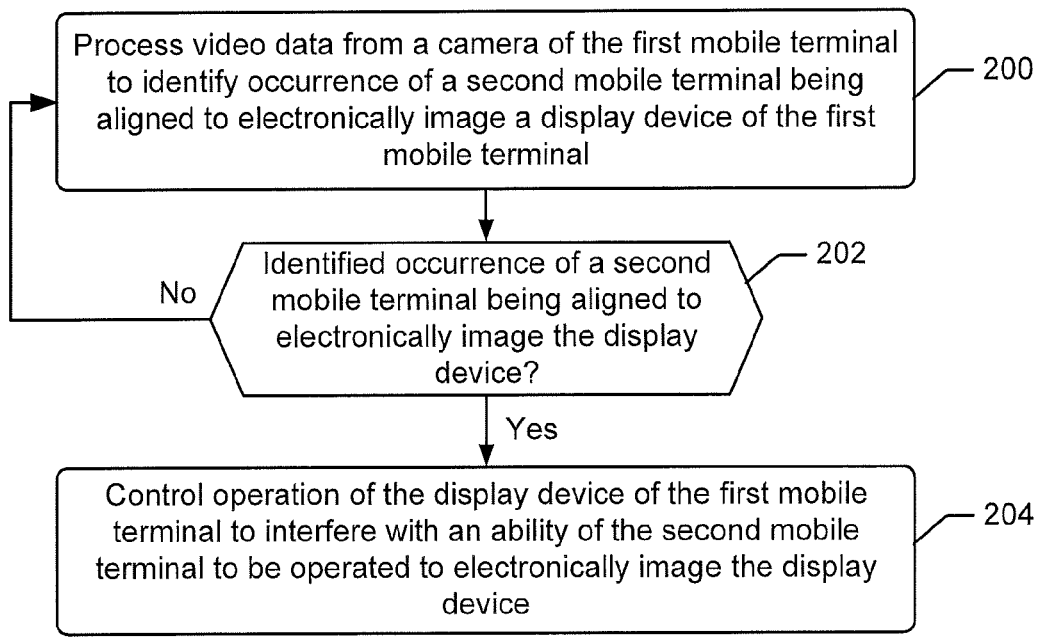
FIGS. 2-9 are flowcharts of operations that can be performed by a mobile terminal, such as the first mobile terminal of FIG. 1, according to some embodiments of the present disclosure.

Referring to the flowchart of FIG. 2 in combination with FIG. 1, the first mobile terminal 100 processes (block 200) video data from a camera 102 of the first mobile terminal 100 to identify occurrence of the second mobile terminal 110 being aligned to electronically image the display device 104 of the first mobile terminal 100. Responsive to identifying (block 202) that the second mobile terminal 110 is being aligned to electronically image the display device 104, the first mobile terminal 100 controls (block 204) operation of the display device 104 to interfere with an ability of the camera 112 of the second mobile terminal 110 to be operated to electronically image the display device 104.

Figure 3:
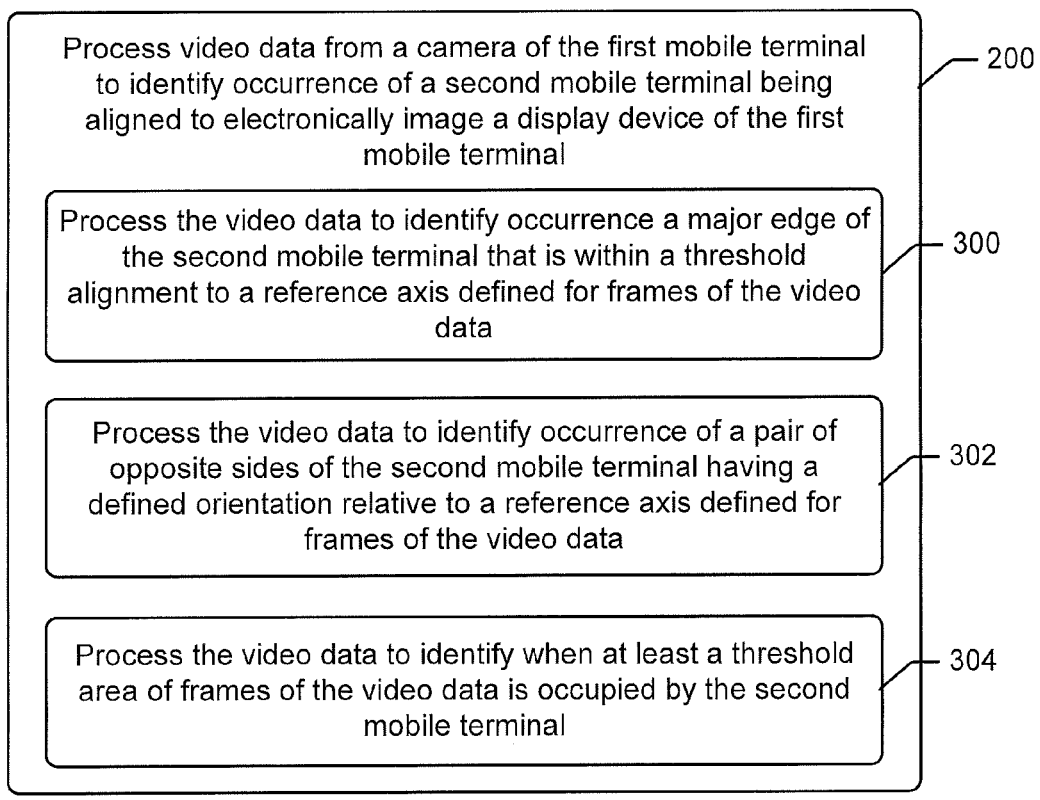

As shown in FIG. 1, the first mobile terminal 100 includes a camera 102, which may be a front or back facing camera, that is used to identify occurrence of another mobile terminal being aligned to possibly electronically image the display device 104. Referring to the various embodiments shown in FIG. 3, when processing (block 200) video data from the camera 102 of the first mobile terminal 100 to identify occurrence of the second mobile terminal 110 being aligned to electronically image the display device 104, the first mobile terminal 100 may process (block 300) the video data to identify occurrence a major edge of the second mobile terminal 110 that is within a threshold alignment to a reference axis defined for frames of the video data. For example, the first mobile terminal 100 may determine when the second mobile terminal has a top, bottom, or side housing surface edge that is within a threshold alignment of an edge of the display device 104. Such alignment indicates that the second mobile terminal 110 is being aligned in a way indicative of a user of the second mobile terminal 110 attempting to take require a photograph, video, and/or other image of the display device 104.

Alternatively or additionally, the first mobile terminal 100 may process (block 302) the video data to identify occurrence of a pair of opposite sides of the second mobile terminal 110 having a defined orientation relative to a reference axis defined for frames of the video data. For example, the first mobile terminal 100 may determine when the second mobile terminal has a pair of opposing housing surfaces edges that have a defined orientation relative to the display device 104, which indicates that the second mobile terminal 110 is being aligned in a way indicative of a user of the second mobile terminal 110 attempting to take require a photograph, video, and/or other image of the display device 104.

Further alternatively or additionally, the first mobile terminal 100 may process (block 304) the video data to identify when at least a threshold area of frames of the video data is occupied by the second mobile terminal 110. For example, the first mobile terminal 100 may determine when the second mobile terminal has been brought within a defined range of the first mobile terminal 100, where the range has been defined based on a typical field of view of mobile terminal cameras and a resulting distance that would occur between such a mobile terminal camera on another mobile terminal and the display device 104 in order for at least a major portion of the display device 104 to be within the field of view of the camera.

The first mobile terminal 100 may initiate the interference responsive to identifying when the second mobile terminal 110 has been maintained with the observed alignment, orientation, and/or range for a threshold time which is indicative of the second mobile terminal 110 being steadied in preparation for taking a photo, video, and/or other image of the display device 104.

FIGS. 4-9 illustrate embodiments of various of operations that may be performed by the first mobile terminal 100 to respond to an identification of occurrence of another mobile terminal being aligned to electronically image the display device 104, by controlling operation of the display device 104 to interfere with an ability of the another mobile terminal to be operated to electronically image the display device 104.

Figure 4:
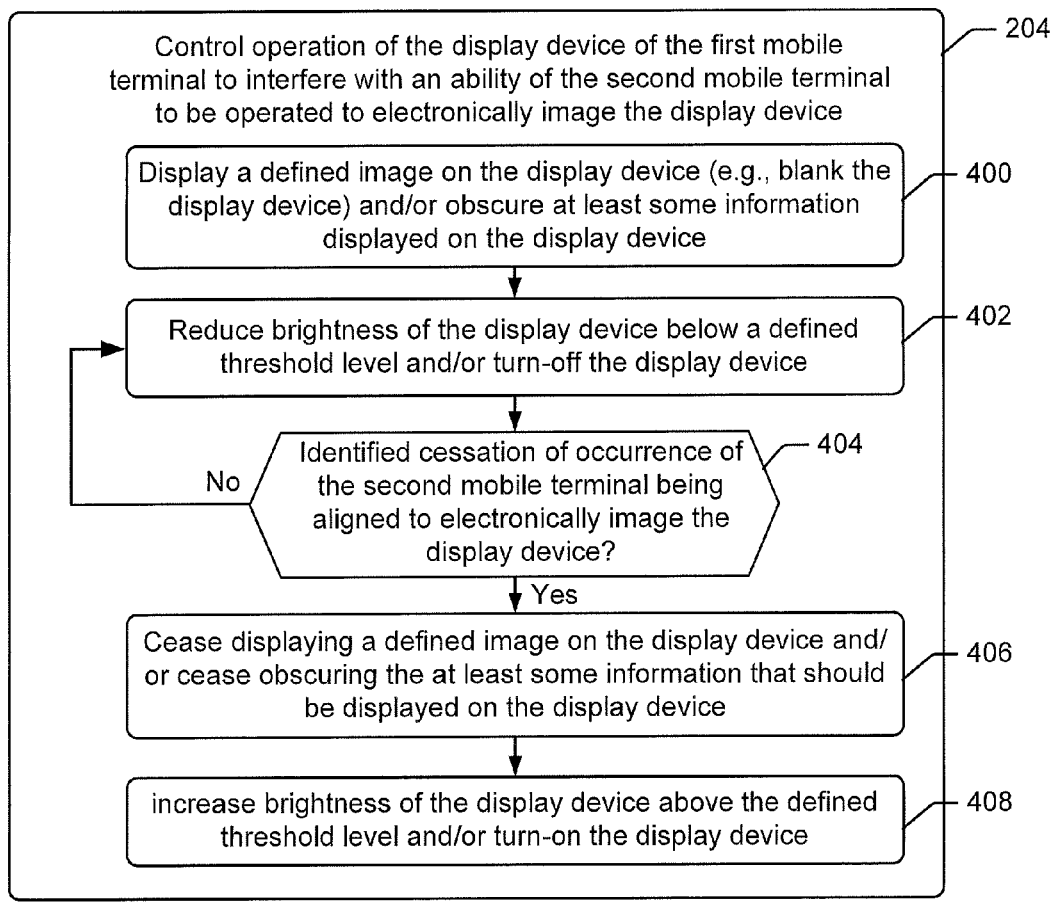

Referring to the embodiment of FIG. 4, responsive to identifying occurrence of the second mobile terminal 110 being aligned to electronically image the display device 104, the first mobile terminal 100 controls (block 204) operation of the display device 104 by operations that can include displaying (block 400) a defined image on the display device 104 (e.g., blank the display screen) and/or obscuring at least some information displayed on the display device 104. First mobile terminal 100 may alternatively or additionally reduce brightness of the display device 104 below a defined threshold level that will interfere with the ability of the camera 112 of the second mobile terminal 110 to be used to image any information on the display device 104, and/or may turn-off the display device 104.

Responsive to identifying (block 404) cessation of occurrence of the second mobile terminal 110 being aligned to electronically image the display device 104, the first mobile terminal 100 can respond by ceasing (block 406) displaying the defined image on the display device 104 and/or ceasing to obscure information that should be displayed on the display device 104. The first mobile terminal 100 may alternatively or additionally increase (block 408) brightness of the display device 104 above the defined threshold level (e.g., back to a brightness level that existed before the brightness reduction (block 402) and/or may turn-on the display device 104.

Figure 5:
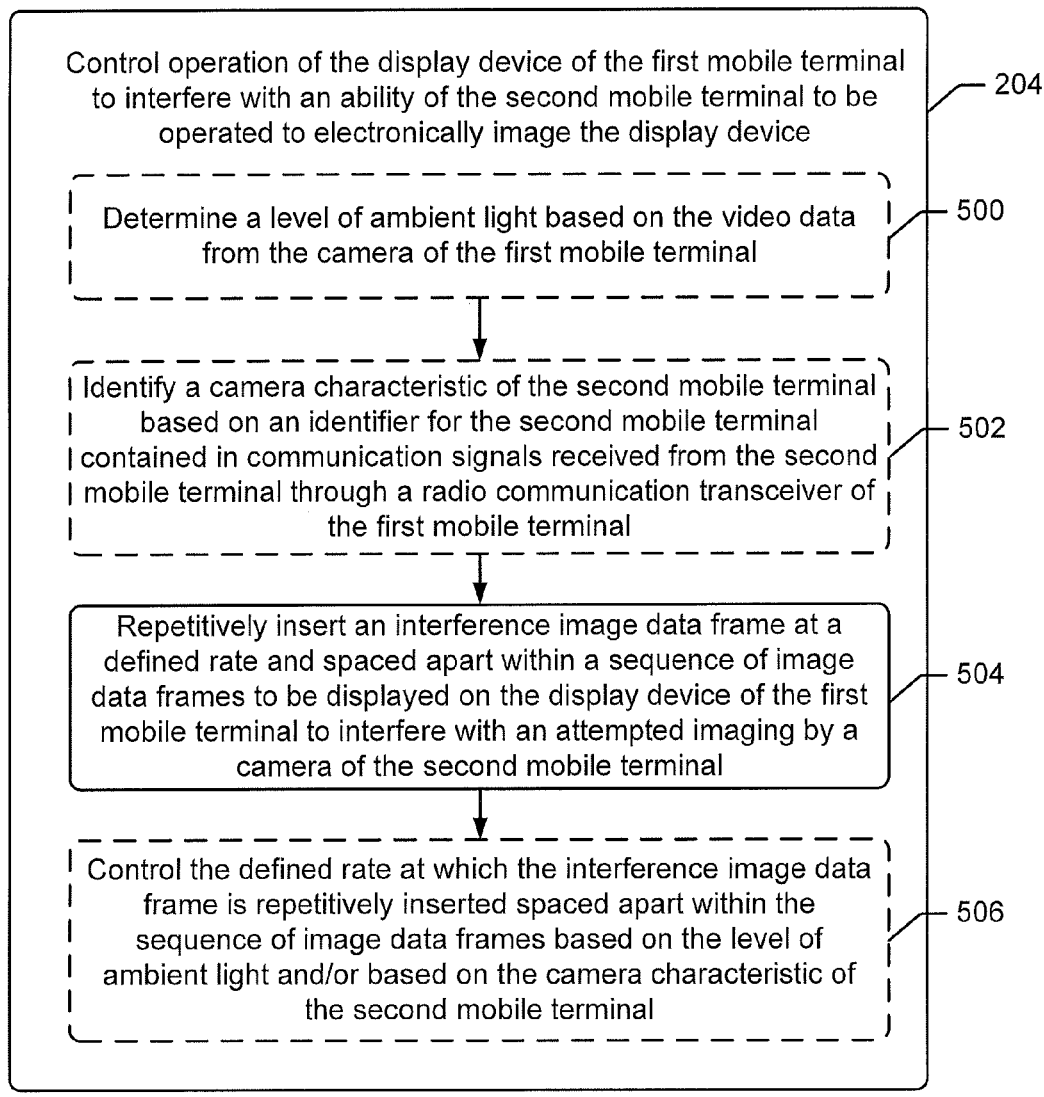

Referring to the alternative or additional embodiments of FIG. 5, the first mobile terminal 100 repetitively inserts (block 504) an interference image data frame at a defined rate and spaced apart within a sequence of image data frames to be displayed on the display device 104 of the first mobile terminal 100 to interfere with an attempted imaging by the camera 112 of the second mobile terminal 110. Repetitively inserting an interference image data frame can allow a user of the first mobile terminal 100 to continue to observe information (contained in the original image data frames) displayed on the display device 104 but with a flickering occurring at a frequency that is selected to interfere with imaging by the camera 112. The frequency may be selected based on a typical image capture scan rate for mobile terminal cameras to degrade any image captured by the camera 112 and possibly render information illegible or degraded in the captured image.

In one embodiment, the first mobile terminal 100 generates the interference image data frame to alternate between at least two masks each having an arrangement of spaced apart objects when displayed on the display device 104, and at locations for the spaced apart objects that are offset between the at least two masks. The frequency of the alternate masks may be selected based on a typical image capture scan rate for mobile terminal cameras to degrade or reduce useless any image captured by the camera 112.

In another embodiment, the first mobile terminal 100 generates the interference image data frame to alternate between a pair of the masks that display spaced apart lines that dither between offset bit locations of the display device 104 when alternately displayed on the display device 104. The frequency of the alternate masks may be selected based on a typical image capture scan rate for mobile terminal cameras to degrade or reduce useless any image captured by the camera 112.

In another embodiment, the first mobile terminal 100 determines the frequency of the alternate masks based on a characteristic of the camera 112. The first mobile terminal 100 can identify (block 502) a camera characteristic of the second mobile terminal 110 based on an identifier for the second mobile terminal 110 contained in communication signals received from the second mobile terminal 110 through a radio communication transceiver of the first mobile terminal 100. The first mobile terminal 100 can responsively control (block 506) the defined rate at which the interference image data frame is repetitively inserted spaced apart within the sequence of image data frames based on the camera characteristic of the second mobile terminal 110.

The identifier may, for example, identify the manufacturer of the second mobile terminal 110, the capability of the second mobile terminal 110, and/or other information which can be used to categorize the second mobile terminal 110 and look-up a frequency which may be suitable to interfere with the ability of the second mobile terminal to image the display device 104 while possibly allowing a user to continue to view information that was previously displayed.

In another embodiment, the first mobile terminal 100 determines the frequency of the alternate masks based on a level of ambient light. The first mobile terminal 100 can determine (block 500) a level of ambient light based on the video data from the camera 102 of the first mobile terminal 100. The first mobile terminal 100 can responsively control (block 506) the defined rate at which the interference image data frame is repetitively inserted spaced apart within the sequence of image data frames based on the level of ambient light.

Figure 6:
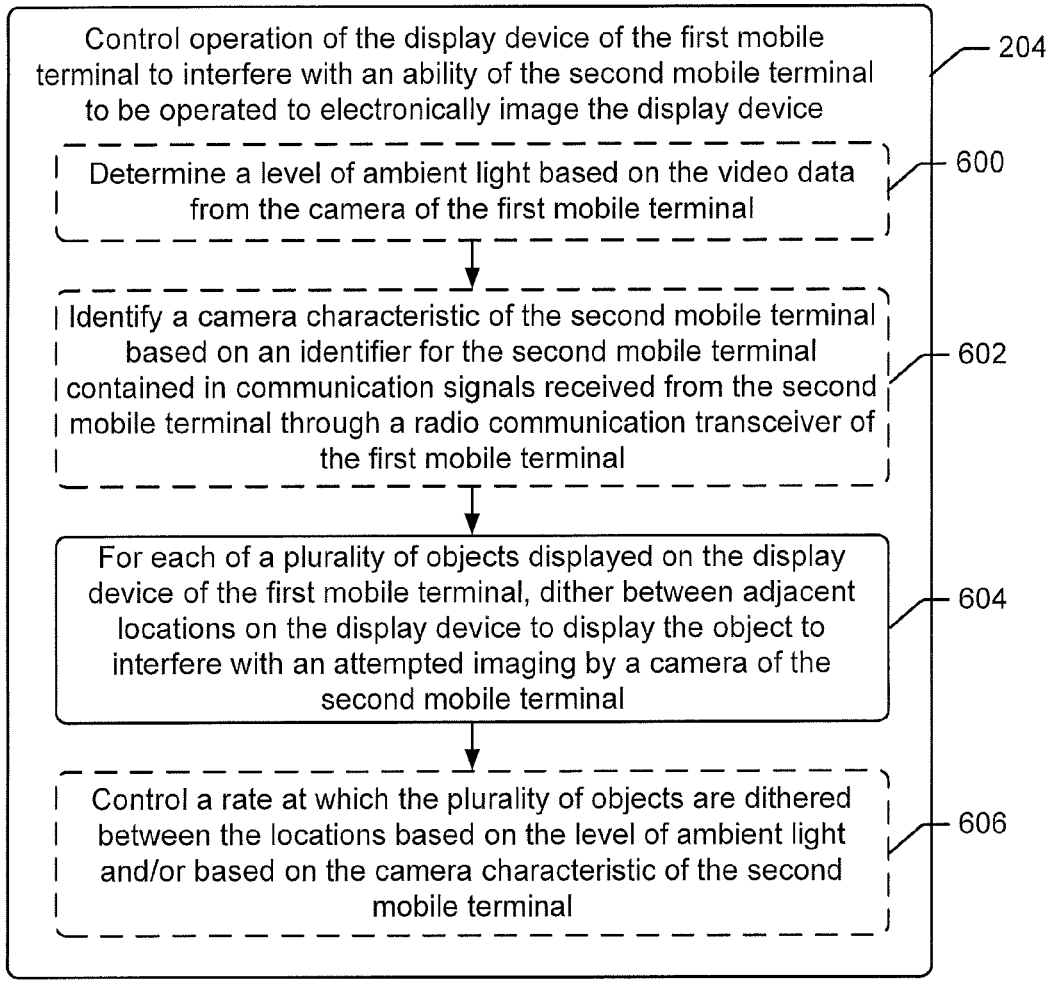

FIG. 6 illustrates another set of embodiments which are directed to interfering with an ability of the second mobile terminal 110 to use a camera 112 to image the display device 104 by dithering locations of objects (e.g., letters, graphical indicia, etc.) displayed on the display device 104. Referring to FIG. 6, responsive to identifying occurrence of the second mobile terminal 110 being aligned to take a photo of the display device 104, the first mobile terminal 100 performs, for each of a plurality of objects displayed on the display device of the first mobile terminal, dithering (block 604) between adjacent locations on the display device to display the object to interfere with an attempted imaging by the camera 104 of the second mobile terminal 100. Subsequently, responsive to identifying cessation of occurrence of the second mobile terminal 110 being aligned to electronically image the display device 104, the first mobile terminal 100 ceases the dithering of locations of each of the plurality of objects displayed on the display device 104.

The first mobile terminal 100 may determine (block 600) a level of ambient light based on the video data from the camera 104 of the first mobile terminal 100, and responsively control (block 606) a rate at which the plurality of objects are dithered between the locations based on the level of ambient light.

Alternatively or additionally, the first mobile terminal 100 may identify (block 602) a characteristic of the camera 112 of the second mobile terminal 110 based on an identifier for the second mobile terminal 110 contained in communication signals received from the second mobile terminal 110 through a radio communication transceiver of the first mobile terminal 100. The first mobile terminal 100 can responsively control (block 606) a rate at which the plurality of objects are dithered between the locations based on the determined characteristic. The identifier may, for example, identify the manufacturer of the second mobile terminal 110, the capability of the second mobile terminal 110, and/or other information which can be used to categorize the second mobile terminal 110 and look-up a dithering rate which may be suitable to interfere with the ability of the second mobile terminal to image the display device 104 while possibly allowing a user to continue to view information that was previously displayed.

Figure 7:
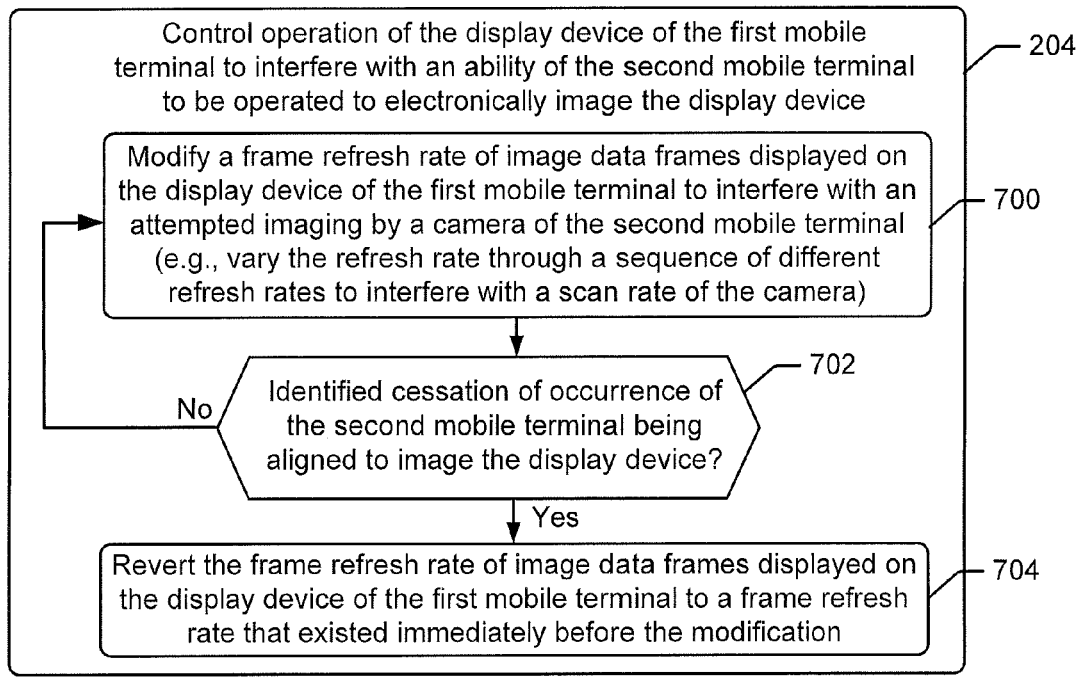
Figure 8:
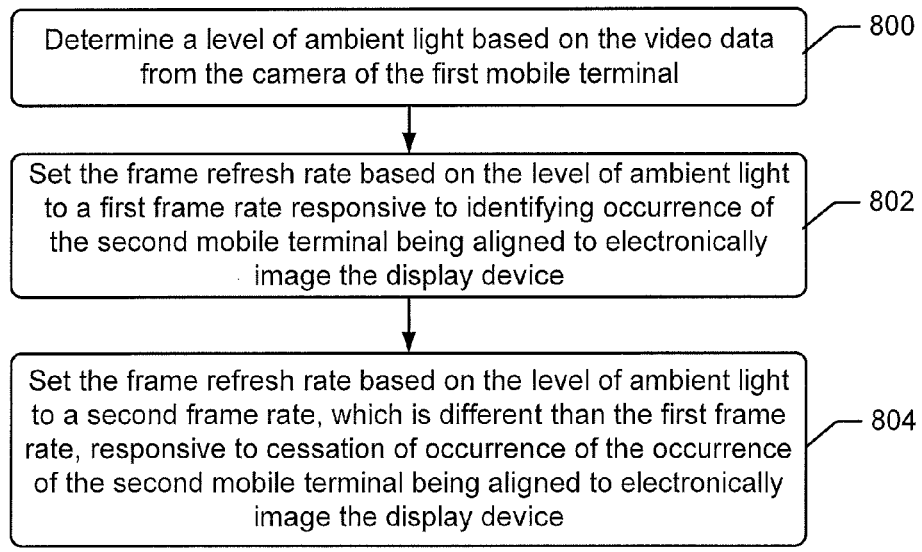
Figure 9:
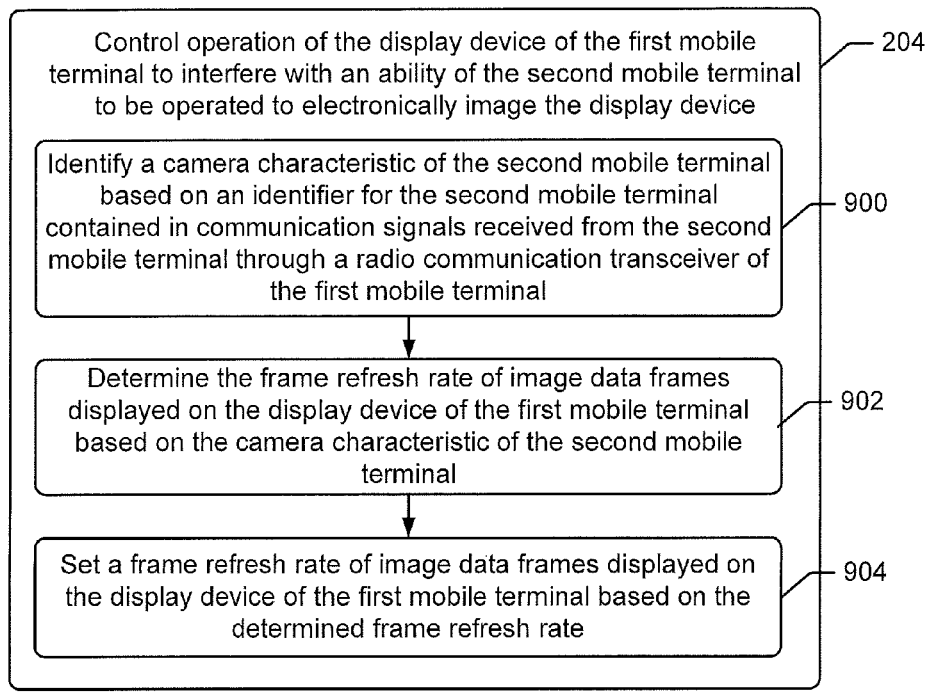

FIGS. 7-9 illustrates another set of embodiments which are directed to interfering with an ability of the second mobile terminal 110 to use a camera 112 to image the display device 104 by varying the frame refresh rate of image data frames displayed on the display device 104 of the first mobile terminal 100. The first mobile terminal 100 may vary the refresh rate through a sequence of different refresh rates to interfere with a scan rate of the camera 112 of the second mobile terminal 110. For example, the first mobile terminal 100 may alternate at a high-frequency between two frame refresh rates to interfere with the ability of the second mobile terminal 110 to obtain a clear picture and/or video of information displayed on the display device 104.

Referring to FIG. 7, responsive to identifying occurrence of the second mobile terminal 110 being aligned to take a photo of the display device 104, the first mobile terminal 100 modifies (block 700) a frame refresh rate of image data frames displayed on the display device 104 of the first mobile terminal 100 to interfere with an attempted imaging by the camera 112 of the second mobile terminal 110. Subsequently, responsive to identifying (block 702) cessation of occurrence of the second mobile terminal 110 being aligned to obtain an image of the display device 104, the first mobile terminal may respond by reverting (block 704) the frame refresh rate of image data frames displayed on the display device 104 to a frame refresh rate that existed immediately before the modification (block 700) of the frame refresh rate.

Referring to the further embodiment of FIG. 8, the first mobile terminal 100 determines (block 800) a level of ambient light based on the video data from the camera 102 of the first mobile terminal 100, and sets (block 802) the frame refresh rate based on the level of ambient light to a first frame rate responsive to identifying occurrence of the second mobile terminal 110 being aligned to electronically image the display device 104. The first mobile terminal 100 subsequently sets (block 804) the frame refresh rate based on the level of ambient light to a second frame rate, which is different than the first frame rate, responsive to cessation of occurrence of the occurrence of the second mobile terminal 110 being aligned to electronically image the display device 104. Thus, given the same level of ambient light, the first mobile terminal 100 uses different frame refresh rates depending upon whether another mobile terminal is presently identified as being aligned to electronically image the display device 104.

Referring to the further embodiment of FIG. 9, the first mobile terminal 100 can be configured to identify (block 900) a camera characteristic of the second mobile terminal 110 based on an identifier for the second mobile terminal 110 contained in communication signals received from the second mobile terminal 110 through a radio communication transceiver of the first mobile terminal 100. The first mobile terminal 100 can determine (block 902) the frame refresh rate of image data frames displayed on the display device 104 of the first mobile terminal 100 based on the camera 112 characteristic of the second mobile terminal 110, and can use the determined frame refresh rate to set (block 904) the frame refresh rate at which image data frames are displayed on the display device 104.

Thus, one or more embodiments of the present disclosure may reduce or eliminate various concerns arising from the proliferation of high resolution cameras on mobile terminals and resulting ability of persons to improperly obtain images of information displayed on another mobile terminal. Various mobile terminals have been disclosed that are configured to identify occurrence of another mobile terminal being aligned to electronically image display device of the mobile terminal and to interfere with an ability of the other mobile terminal to be operated to electronically image the display device. One or more of these embodiments may entirely prevent such images from being obtained or may reduce the quality of the image so as to obscure information that is displayed on the display device or render a resulting image to be deemed unacceptable by the person who initiated the image.

Figure 10:
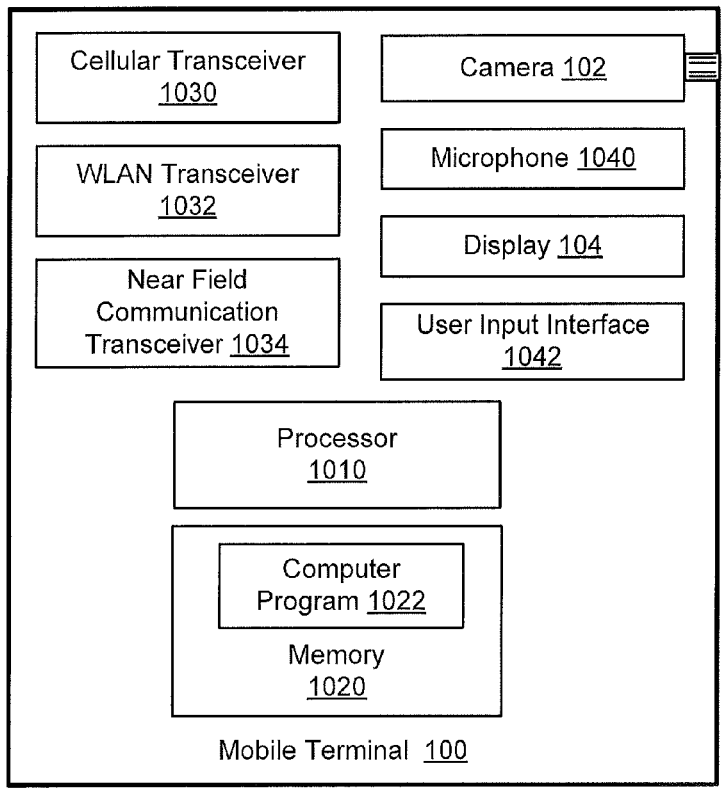
FIG. 10 is a block diagram of a mobile terminal according to some embodiments of the present disclosure.

FIG. 10 is a block diagram of a mobile terminal 100 according to some embodiments of the present disclosure. The mobile terminal 100 may include a computing/processing device such as a smart phone, a palmtop computer, a tablet computer, a laptop computer, a gaming device, a video playback device, a smart watch, and/or a smart appliance. The mobile terminal 100 can include one or more processor circuits 1010 (referred to as "processor" for brevity), one or more memory circuits 1020 (referred to as "memory" for brevity) containing computer readable program code 1022, a camera 102, and a display device 104. The mobile terminal 100 may additionally include a cellular transceiver 1030, a wireless local area network transceiver 1032, a near field communication transceiver 1034, a microphone 1040, user input interface 1042, and/or other components.

The processor 1010 may include one or more data processing circuits, such as a general purpose and/or special purpose processor (e.g., microprocessor and/or digital signal processor) that may be collocated or distributed across one or more networks. The processor 1010 is configured to execute the program code 1022 in the memory 1020, described below as a computer readable storage medium, to perform some or all of the operations for one or more of the embodiments disclosed herein.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a first mobile terminal, comprising:
processing video data from a camera of the first mobile terminal to identify occurrence of a second mobile terminal being aligned to electronically image a display device of the first mobile terminal; and
responsive to identifying occurrence of the second mobile terminal being aligned to electronically image the display device, controlling operation of the display device of the first mobile terminal to interfere with an ability of the second mobile terminal to be operated to electronically image the display device, by repetitively inserting an interference image data frame at a defined rate and spaced apart within a sequence of image data frames to be displayed on the display device of the first mobile terminal to interfere with an attempted imaging by a camera of the second mobile terminal.

2. The method of claim 1, wherein the processing video data from a camera of the first mobile terminal to identify occurrence of a second mobile terminal being aligned to electronically image a display device of the first mobile terminal, comprises:
processing the video data to identify occurrence a major edge of the second mobile terminal that is within a threshold alignment to a reference axis defined for frames of the video data.

3. The method of claim 1, wherein the processing video data from a camera of the first mobile terminal to identify occurrence of a second mobile terminal being aligned to electronically image a display device of the first mobile terminal, comprises:
processing the video data to identify occurrence of a pair of opposite sides of the second mobile terminal having a defined orientation relative to a reference axis defined for frames of the video data.

4. The method of claim 1, wherein the processing video data from a camera of the first mobile terminal to identify occurrence of a second mobile terminal being aligned to electronically image a display device of the first mobile terminal, comprises:

processing the video data to identify when at least a threshold area of frames of the video data is occupied by the second mobile terminal.

5. The method of claim 1, further comprising:
generating the interference image data frame to alternate between at least two masks each having an arrangement of spaced apart objects when displayed on the display device, and locations of the spaced apart objects are offset between the at least two masks.

6. The method of claim 1, wherein the generating the interference image data frame to alternate between at least two masks each having an arrangement of spaced apart objects when displayed on the display device, and locations of the spaced apart objects are offset between the at least two masks, comprises:
generating the interference image data frame to alternate between a pair of the masks that display spaced apart lines that dither between offset bit locations of the display device when alternately displayed on the display device.

7. The method of claim 1, further comprising:
identifying a camera characteristic of the second mobile terminal based on an identifier for the second mobile terminal contained in communication signals received from the second mobile terminal through a radio communication transceiver of the first mobile terminal; and
controlling the defined rate at which the interference image data frame is repetitively inserted spaced apart within the sequence of image data frames based on the camera characteristic of the second mobile terminal.

8. A method by a first mobile terminal, comprising:
processing video data from a camera of the first mobile terminal to identify occurrence of a second mobile terminal being aligned to electronically image a display device of the first mobile terminal; and
responsive to identifying occurrence of the second mobile terminal being aligned to electronically image the display device, controlling operation of the display device of the first mobile terminal to interfere with an ability of the second mobile terminal to be operated to electronically image the display device, by:
for each of a plurality of objects displayed on the display device of the first mobile terminal, dithering between adjacent locations on the display device to display the object to interfere with an attempted imaging by a camera of the second mobile terminal; and
responsive to identifying cessation of occurrence of the second mobile terminal being aligned to electronically image the display device, ceasing the dithering of locations of each of the plurality of objects displayed on the display device.

9. The method of claim 8, further comprising:
determining a level of ambient light based on the video data from the camera of the first mobile terminal;
controlling a rate at which the plurality of objects are dithered between the locations based on the level of ambient light.

10. The method of claim 8, further comprising:
identifying a camera characteristic of the second mobile terminal based on an identifier for the second mobile terminal contained in communication signals received from the second mobile terminal through a radio communication transceiver of the first mobile terminal; and
controlling a rate at which the plurality of objects are dithered between the locations based on the camera characteristic of the second mobile terminal.

11. A method by a first mobile terminal, comprising:
processing video data from a camera of the first mobile terminal to identify occurrence of a second mobile terminal being aligned to electronically image a display device of the first mobile terminal;
responsive to identifying occurrence of the second mobile terminal being aligned to electronically image the display device, controlling operation of the display device of the first mobile terminal to interfere with an ability of the second mobile terminal to be operated to electronically image the display device, by
modifying a frame refresh rate of image data frames displayed on the display device of the first mobile terminal to interfere with an attempted imaging by a camera of the second mobile terminal.

12. The method of claim 11, further comprising:
responsive to identifying cessation of occurrence of the second mobile terminal being aligned to electronically image the display device, reverting the frame refresh rate of image data frames displayed on the display device of the first mobile terminal to a frame refresh rate that existed immediately before the modifying.

13. The method of claim 12, further comprising:
determining a level of ambient light based on the video data from the camera of the first mobile terminal;
setting the frame refresh rate based on the level of ambient light to a first frame rate responsive to identifying occurrence of the second mobile terminal being aligned to electronically image the display device; and
setting the frame refresh rate based on the level of ambient light to a second frame rate, which is different than the first frame rate, responsive to cessation of occurrence of the occurrence of the second mobile terminal being aligned to electronically image the display device.

14. The method of claim 11,
further comprising identifying a camera characteristic of the second mobile terminal based on an identifier for the second mobile terminal contained in communication signals received from the second mobile terminal through a radio communication transceiver of the first mobile terminal; and
wherein the modifying a frame refresh rate of image data frames displayed on the display device of the first mobile terminal to interfere with an attempted imaging by a camera of the second mobile terminal, comprises determining the frame refresh rate of image data frames displayed on the display device of the first mobile terminal based on the camera characteristic of the second mobile terminal.

15. The method of claim 11, wherein the modifying a frame refresh rate of image data frames displayed on the display device of the first mobile terminal to interfere with an attempted imaging by a camera of the second mobile terminal, comprises:
varying the refresh rate through a sequence of different refresh rates to interfere with a scan rate of the camera of the second mobile terminal.

* * * * *